(12) United States Patent
Kobayashi et al.

(10) Patent No.: US 10,295,882 B2
(45) Date of Patent: May 21, 2019

(54) DISPLAY DEVICE

(71) Applicant: NATIONAL UNIVERSITY CORPORATION CHIBA UNIVERSITY, Chiba-shi, Chiba (JP)

(72) Inventors: Norihisa Kobayashi, Chiba (JP); Kazuki Nakamura, Chiba (JP); Yuichi Watanabe, Chiba (JP)

(73) Assignee: NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 0 days.

(21) Appl. No.: 15/647,732

(22) Filed: Jul. 12, 2017

(65) Prior Publication Data

US 2017/0371219 A1    Dec. 28, 2017

Related U.S. Application Data

(63) Continuation of application No. 13/583,919, filed as application No. PCT/JP2011/055846 on Mar. 11, 2011, now abandoned.

(30) Foreign Application Priority Data

Mar. 11, 2010 (JP) ................................ 2010-055170
Jul. 7, 2010 (JP) ................................ 2010-154498

(51) Int. Cl.
*F21V 9/00*    (2018.01)
*G02F 1/15*    (2006.01)
(Continued)

(52) U.S. Cl.
CPC ............. *G02F 1/157* (2013.01); *C09K 11/06* (2013.01); *F21V 9/00* (2013.01); *G02F 1/1521* (2013.01);
(Continued)

(58) Field of Classification Search
CPC ..... F21V 5/04; F21V 5/02; F21V 5/00; F21V 7/0091; F21Y 2101/02; F21Y 2103/00
(Continued)

(56) References Cited

U.S. PATENT DOCUMENTS 4,371,268 A * 2/1983 Miyasaka ............. G04G 5/022
                                                345/49
4,465,339 A * 8/1984 Baucke .................. B60R 1/088
                                                252/600
(Continued)

FOREIGN PATENT DOCUMENTS

JP    54-043050    4/1979
JP    04-105382    4/1992
(Continued)

OTHER PUBLICATIONS

International Search Report received in International Patent Application No. PCT/JP2011/055846, dated Jul. 12, 2011, filed on Mar. 11, 2011, in 2 pages.
(Continued)

*Primary Examiner* — Bryon T Gyllstrom
(74) *Attorney, Agent, or Firm* — Knobbe, Martens, Olson & Bear LLP

(57) ABSTRACT

Disclosed is a high quality display device which avoids complicated element structure, and does not unnecessarily reduce portability. The display device comprises: a pair of substrates which are disposed facing each other, and on each of which electrodes are formed; and a material layer which is sandwiched between the pair of substrates. The material layer contains: a coloring material which changes color upon the application of a voltage; and a light-emitting material which emits light upon photoexcitation.

13 Claims, 17 Drawing Sheets

(51) Int. Cl.
 G09F 9/30 (2006.01)
 G09F 9/37 (2006.01)
 C09K 11/06 (2006.01)
 G02F 1/157 (2006.01)
 G09F 9/302 (2006.01)
(52) U.S. Cl.
 CPC .............. *G09F 9/30* (2013.01); *G09F 9/3023* (2013.01); *G09F 9/372* (2013.01); *C09K 2211/182* (2013.01); *G02F 2202/046* (2013.01)
(58) Field of Classification Search
 USPC ........................................ 362/326, 260, 330
 See application file for complete search history.

(56) References Cited

U.S. PATENT DOCUMENTS

| | | | |
|---|---|---|---|
| 4,596,722 A * | 6/1986 | Warszawski | G02F 1/1508 359/273 |
| 4,652,090 A * | 3/1987 | Uchikawa | G02F 1/1527 359/267 |
| 4,660,939 A | 4/1987 | Tsuchiya et al. | |
| 4,824,221 A | 4/1989 | Endo et al. | |
| 4,850,684 A | 7/1989 | Inaba et al. | |
| 5,612,235 A * | 3/1997 | Wu | H01L 27/1214 438/158 |
| 5,891,511 A * | 4/1999 | Coleman | G02F 1/1523 427/106 |
| 7,090,355 B2 | 8/2006 | Liu et al. | |
| 7,379,224 B2 | 5/2008 | Tonar et al. | |
| 7,796,242 B2 | 9/2010 | Hasegawa et al. | |
| 8,215,787 B2 | 7/2012 | Mathai et al. | |
| 8,686,934 B2 * | 4/2014 | Kimura | G09G 3/3688 345/96 |
| 8,729,795 B2 * | 5/2014 | Nomura | H01L 51/5092 257/40 |
| 2008/0128286 A1 * | 6/2008 | Wu | B82Y 20/00 205/95 |
| 2008/0150970 A1 | 6/2008 | Ozawa et al. | |
| 2009/0052004 A1 | 2/2009 | Nakano et al. | |
| 2009/0085479 A1 * | 4/2009 | Ushikubo | H01L 51/5072 313/506 |
| 2009/0212695 A1 | 8/2009 | Kim et al. | |
| 2009/0279285 A1 | 11/2009 | Nakayama et al. | |
| 2010/0225575 A1 * | 9/2010 | Ishii | G02F 1/167 345/107 |
| 2010/0304359 A1 | 12/2010 | Egan et al. | |
| 2013/0141916 A1 * | 6/2013 | Kobayashi | C09K 11/06 362/260 |
| 2017/0222185 A1 * | 8/2017 | Matsunaga | C23C 14/24 |

FOREIGN PATENT DOCUMENTS

| | | |
|---|---|---|
| JP | 11-352230 | 12/1999 |
| JP | 2002-169154 | 6/2002 |
| JP | 2005-0157061 | 6/2005 |
| JP | 2006-113355 | 4/2006 |
| JP | 2008-130805 | 6/2008 |
| JP | 2008-134536 | 6/2008 |
| JP | 2009-519563 | 5/2009 |
| JP | 2010-125461 | 6/2010 |

OTHER PUBLICATIONS

Watanabe et al., "Fabrication of Novel Reflective-Emissive Dual-Mode Display Cell Based on Electrochemical Reaction," Chemistry Letters, Nov. 13, 2010, vol. 39, pp. 1309-1311.

* cited by examiner

DISPLAY DEVICE

TECHNICAL FIELD

The present invention relates to a display device, and more specifically to a display device comprising both reflective type and light emission type.

BACKGROUND ART

A device for displaying information (i.e., display device), for example television or monitor for PC, is an indispensable in the information society in recent years.

Display type of the display device can be largely categorized into three types of reflective type, transmission type, and light emission type. Generally, in manufacturing the display device, a person who manufactures the display device selects preferable display type depending on the environment for the display device.

However, in recent years, portability of the display device has been enhanced by miniaturization and thin film formation of the display device, so that a mobile display device has often been used under the environment of different brightnesses. Thus, even in such environment, it is required that the display device have high performance for displaying information.

As techniques for a respond to the above requirement, for example display devices in which any of display types is combined with one another are disclosed below in patent references 1 to 3.

PRIOR ART REFERENCES

Patent References

Patent Reference 1: Japanese Patent Application Laid-Open Publication No. 10-125461
Patent Reference 2: Japanese Patent Application Laid-Open Publication No. 2002-169154
Patent Reference 1: Japanese Patent Application Laid-Open Publication No. 2006-113355

DESCRIPTION OF THE INVENTION

Problems to be Solved by the Invention

However, in the display device disclosed in the above Patent Reference 1, since a liquid crystal display device and an organic electroluminescence element should be separately formed, there are problems such that structure and production process for the element are complicated, thickness of the display device is increased, and responding to the requirement of thin film formation is difficult, which leads to a lowering of portability.

In the display device disclosed in the above Patent Reference 2, solubility of an electric field light-emitting material with respect to a liquid crystal material is low, so that sufficient light-emitting property is not liable to be obtained. Also, liquid crystal phase transition temperature is decreased by mixing the electric field light-emitting material, and liquid crystal phase becomes isotropic phase by applying a high voltage during spontaneous light emission, so that liquid crystal structure is liable to disappear.

In the display device disclosed in the above Patent reference 3, there are problems such that a plurality of transparent electrodes should be prepared on a substrate, which leads complicated structure of the element. Also, a light-emitting material anti-diffusion layer should be provided between a light-emitting layer and a coloring layer.

In the case where independent plural display types are used, those plural display types are overlapped in some cases. Thus, deterioration in quality such that it is hard to see display image is often liable to be occurred.

Thus, in view of the above problems, it is an object of the present invention to provide a high quality display device, which prevents complicated element structure without damaging portability in an undesirable manner.

Means for Solving the Problems

A display device according to an aspect of the present invention comprises a pair of substrates which are disposed facing each other, and on each of which electrodes are formed and a material layer which is sandwiched between the pair of substrates. The material layer contains a coloring material which changes color upon the application of a voltage, and a light-emitting material which emits light upon photoexcitation.

Effects of the Invention

Hereinabove, a high quality display device can be provided by preventing complicated element structure without damaging portability in undesirable manner.

BEST MODE FOR CARRYING OUT THE PRESENT INVENTION

Hereinafter, embodiments of the present invention will be described with reference to drawings. However, the present invention can be performed with various different embodiments, and is not limited to embodiments described below.

Embodiment 1

Figure 1:
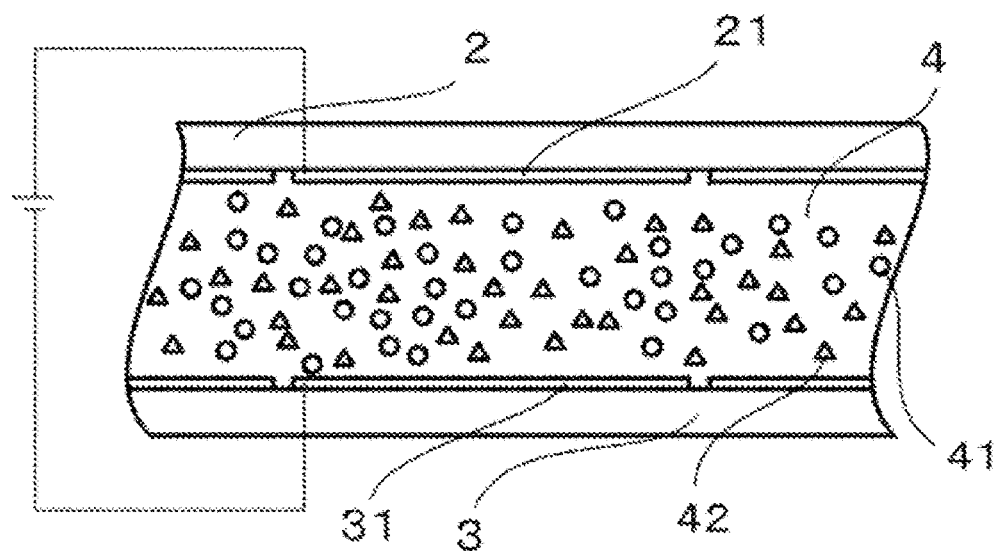
FIG. 1 shows a schematic cross-sectional view of a display device according to an embodiment 1 of the present invention.

FIG. 1 is a schematic cross-sectional view of a display device 1 (hereinafter referred to as "present display device") according to an embodiment of the present invention. As shown in FIG. 1, the present display device 1 comprises a pair of substrates disposed facing each other, on each of which electrodes 21, 31 are formed, and a material layer 4 sandwiched between the pair of substrates 2, 3.

In addition, in the present display device, a light source 5 (described below in FIG. 2) is provided in order to light being irradiated into the pair of substrates 2, 3 and the material layer 4 (hereinafter referred to as "panel portion"). If necessary, light can be irradiated into the panel portion. Not specifically limited, the light source 5 preferably has a light source for photoexcitation which allows a light-emitting material to emit light. This effect is apparent from the description below, in this manner, light (excited light) having the wavelength range in which the light-emitting material emits light can be supplied, and thereby displaying the light emission type display by allowing the light-emitting material to emit light. Herein, the term "light source for photoexcitation" means a light source where light emission is within the wavelength range of absorbed light in order to allow the light emission material to emit light, and more specifically means a light source where peak wavelength of light emission is within the wavelength range of light absorption of the light-emitting material.

In the present embodiment, the pair of substrates 2, 3 are used for sandwiching the material layer 4, and maintaining it. At least one of the substrates 2, 3 may be transparent. Preferably, one of the substrates 2, 3 is transparent and the other one comprises a part having reflecting function, in this manner, the substrate having reflective function may be used as reflecting plate, thereby providing a reflective type display device which has more convenient configuration. In the case where both substrates 2, 3 are transparent, they may be used for transmission type, and moreover used for reflective type by forming a reflective plate on one side of the substrates 2, 3. The material for the substrates 2, 3 are not specifically limited as long as they has hardness to an extent, chemical stability, and can be stably maintain the material layer 4. Examples thereof include glass, plastic, metal, semiconductor, or the like. In case of using the transparent substrate, glass or plastic may be used, and in case of having reflective function, metal, semiconductor, or the like may be used.

In the present embodiment, electrodes 21, 31 are formed on each side (inner side) of the substrates 2, 3 facing each other. The electrodes 2, 3 are used for applying a voltage to the material layer 4 sandwiched therebetween, materials for electrodes 2, 3 are not specifically limited as long as they have favorable electric conductivity. Examples thereof preferably include transparent electrodes such as ITO, IZO, or the like when the substrates 2, 3 are transparent, and metal electrodes such as Cu, Al, or the like when the substrates 2, 3 are not transparent. The transparent electrode may be employed, moreover a metal substrate may be used as an electrode by utilizing electric conductivity of the metal substrate itself. (In this case, the electrode is also formed on the substrate.) In the case where the substrate has electric conductivity like metal etc., in order to prevent the electrode from being short in undesirable position, insulator, and the like are preferably provided between the substrate and the electrode.

The electrodes according to the present embodiment may be formed as a shape which is adjusted to pattern such as a character to be displayed, and may also be formed by electrode pattern divided into multiple identical regions being aligned on plural substrates. When the electrode pattern is divided into multiple regions, each of regions is to be a pixel, and display is controlled in each pixel. Therefore, it has an advantage in displaying complicated shapes.

The electrodes according to the present embodiment are connected to a power source via wirings having respective electric conductivities, and applying a voltage or applying no voltage to the material layer 4 can be controlled by turning on the power source or turning off the power source. When the voltage is applied, the strength of the voltage can be appropriately modulated depending on space between the pair of substrates or space between the pair of electrodes. Not specifically limited, the strength of the electric field is preferably $1.0 \times 10^4$ V/m or more and $1.0 \times 10^6$ V/m or less, and more preferably $1.0 \times 10^5$ V/m or less.

The material layer 4 according to the present embodiment includes a coloring material or a light-emitting material by different stimuli, and specifically a coloring material 41 and a light-emitting material 42. The material layer 4 according to the present embodiment preferably contains a solvent for maintaining these materials, and a supporting electrolyte in addition to the coloring material 41 and the light-emitting material 42.

The supporting electrolyte is not specifically limited as long as it expedites oxidation-reduction of the coloring material 41. Examples thereof preferably include lithium salt, potassium salt, sodium salt, and the like. No specifically limited, examples of lithium salt include LiCl, LiBr, LiI, $LiBF_4$, $LiClO_4$, and the like, examples of potassium salt include KCl, KI, KBr, and the like, and examples of sodium salt include NaCl, NaBr, BaI, and the like. The concentration of the supporting electrolyte, not specifically limited, is preferably 10 mM or more and 1 M or less.

The solvent is not specifically limited as long as the coloring material 41 and the light-emitting material 42 are stably maintained. The solvent may be a polar solvent such as water, and the like, and may be also organic solvent having no polarity, ionic liquid, ionic electric conducting polymer. Examples thereof include carbonic acid propylene, dimethyl sulfoxide, N,N-dimethyl formamide, tetrahydrofuran, acetonitrile, polyvinyl sulfuric acid, polystyrene sulfonic acid, poly acrylic acid, and the like.

The coloring material 41 is a material which changes its color upon applying a voltage thereto. Display can be obtained by the color change. Not specifically limited, the coloring material 41 preferably contains at least any of an organic electrochromic material and an inorganic electrochromic material. Not specifically limited, examples of the organic electrochromic material include viologen derivative, polypyrrole derivative, polyaniline derivative, polythiophene derivative, phenylester derivative, anthraquinone derivative, phenylamine derivative, and the like. More specifically, examples thereof included 1,4-diacetyl benzene, N,N'-dimethyl viologen, poly(3,4-ethylenedioxythiophene), polyaniline, 1,4-diheptyl viologen, 4,4'-biphenyl dicarboxylic acid diethyl ester, and dimethyl terephthalate. Not specifically limited, examples of the inorganic electrochromic material include transition metal oxide such as iridium hydroxide titanium oxide, and metal hydroxide such as iridium hydroxide. Examples of the organic electrochromic material are shown below in chemical formula 1. Preferably, at least any thereof may be used as examples.

[chemical formula 1]

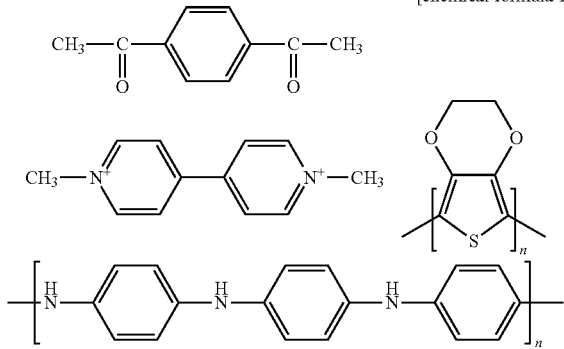

Figure 2:
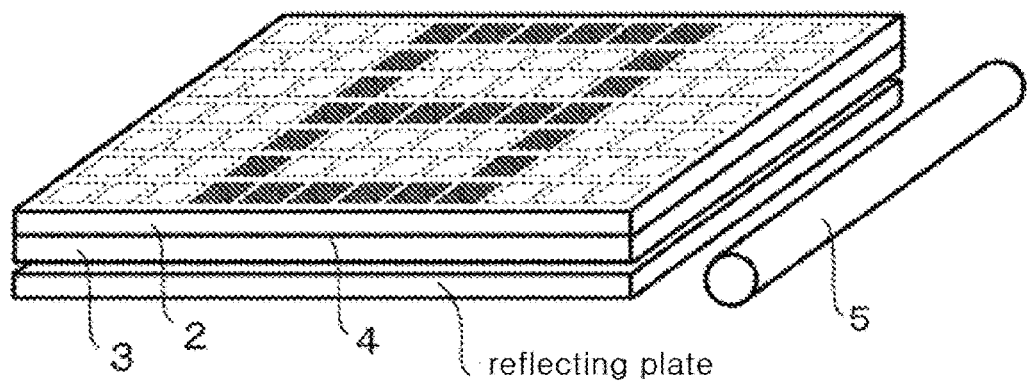
FIG. 2 is a view for describing display in a reflective type display method of a display device according to an embodiment 1 of the present invention.

In the present embodiment, the coloring material 41, as mentioned above, can change its color upon applying a voltage between electrodes. It is possible to distinguish the colored region from the other region, therefore the coloring material 41 can be used for a reflective type display. In this case, image is shown in FIG. 2 (herein, a coloring portion is a portion upon applying a voltage, non-coloring portion is a portion upon applying no voltage.). Not specifically limited, the concentration of the coloring material 41, for example, is preferably 0.5 mM or more and 300 mM or less, and more preferably 100 mM or less. Not specifically limited, the present display device, a plurality of displays can be performed based on the combination of the coloring material 41 and the light-emitting material 42. Not specifically limited, when the concentration of the light-emitting material 42 is set to be 1, the concentration of the coloring material 41 is preferably 0.1 or more and 5 or less, more preferably 0.5 or more and 2 or less.

The light-emitting material 42 is a material which is excited to emit light upon irradiation of light. Not specifically limited, a rare earth metal complex is preferably used in view of energy migration with respect to the coloring material 41. Herein, the rare earth metal complex is a rare earth metal and a compound in which ligand is liganded to the rare earth element. Not specifically limited, examples of the rare earth metal used for the rare earth metal complex include Eu, Tb, Yb, and the like. Not specifically limited, specific examples of the light-emitting material 42 include at least any of tris(hexafluoroacetylacetonate) europium(III), tris(hexafluoroacetylacetonate) terbium(III), and tris (hexafluoroacetylacetonate) ytterbium(III). In the light-emitting material 42 according to the present embodiment, the peak wavelength of light absorption for exciting light emission may be in the wavelength range of visible light, and moreover may be preferably in the outside wavelength range of visible light (e.g., in the wavelength range of less than 360 nm and larger than 830 nm). When the outside wavelength range of visible light is used, only light-emitting area can be emphatically displayed in the light-emitting display state, thereby contributing to the enhancement of contrast ratio. The concentration of the light-emitting material 42 is not specifically limited as long as the light-emitting material 42 has the above-mentioned function. For example, the concentration thereof is preferably 0.5 mM or more and 300 mM or less, and more preferably 100 mM or less.

Figure 3:
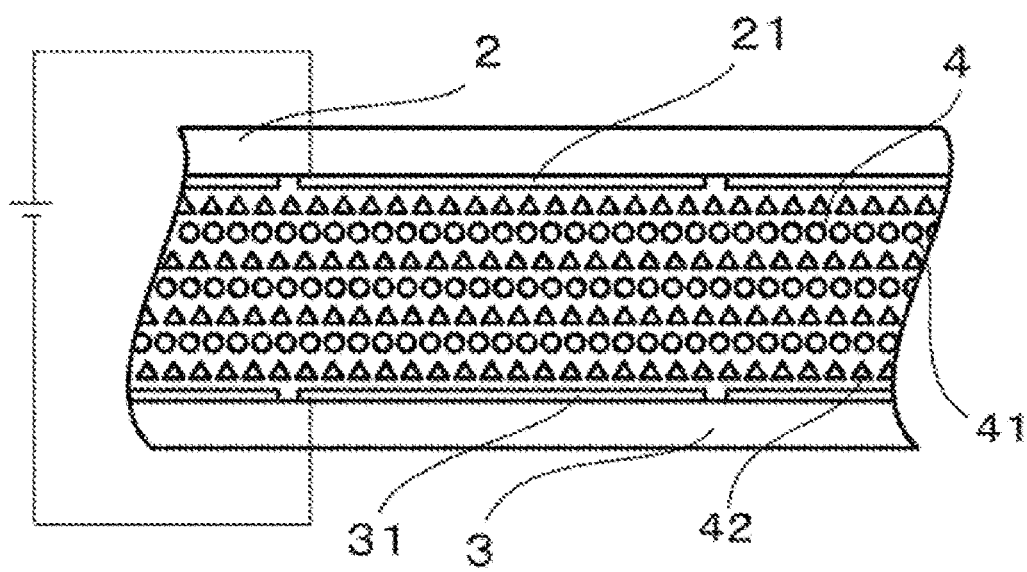
FIG. 3 is a schematic view illustrating another example of a material layer of a display device.
Figure 4:
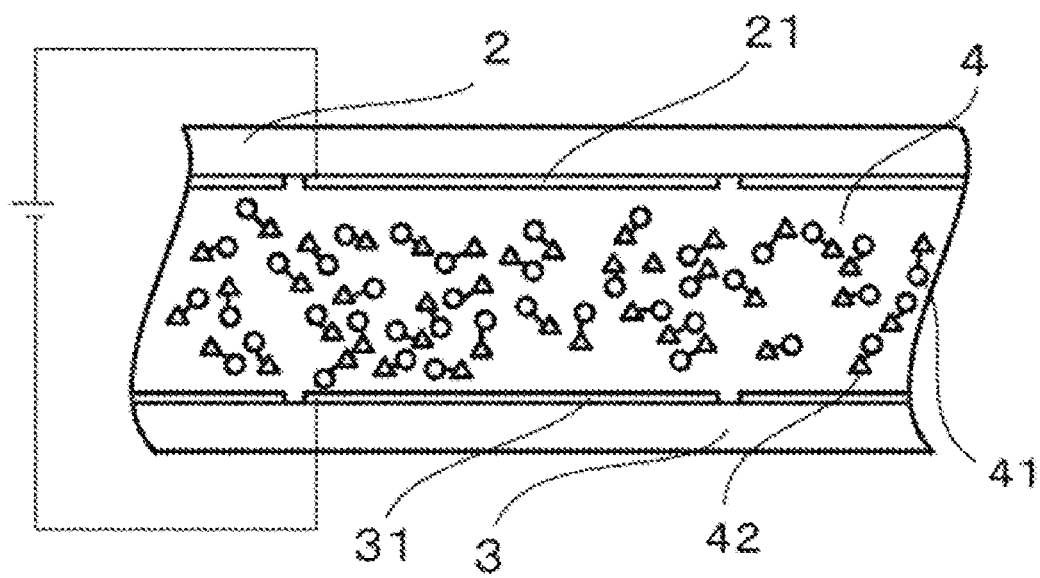
FIG. 4 is a schematic view illustrating a third example of a material layer of a display device.

In the present embodiment, the coloring material 41 is preferably adjacent to the light-emitting material 42. In this manner, as described below, undesirable light emission can be suppressed by migrating energy from the light-emitting material 42 to the coloring material 41. Not specifically limited, means for the coloring material 41 being adjacent to the light-emitting material 42 comprises: as shown in FIG. 1, dispersed arrangement of the coloring material 41 and the light-emitting material 42 with relative high concentration; as shown in FIG. 3, alternant laminated formation of the coloring material 41 and the light-emitting material 42; and as shown in FIG. 4, chemical combination of the coloring material 41 and the light-emitting material 42 such as covalent bond, and the like. Not specifically limited, examples of the chemical combination thereof, as combination of the above examples, include tris(hexafluoroacetylacetonate) europium (triphenylphosphin oxide)/polyaniline, tris(hexafluoroacetylacetonate) terbium (triphenylphosphin oxide)/polyaniline, tris(hexafluoroacetylacetonate) ytterbium (triphenylphosphin oxide)/polyaniline, tris(hexafluoroacetylacetonate) europium (1,4-diacetyl benzene), tris (hexafluoroacetylacetonate) terbium (1,4-diacetyl benzene), and tris(hexafluoroacetylacetonate) ytterbium (1,4-diacetyl benzene). In the following chemical formula 2, examples of the material which is chemically combined with metal complex are shown.

[chemical formula 2]

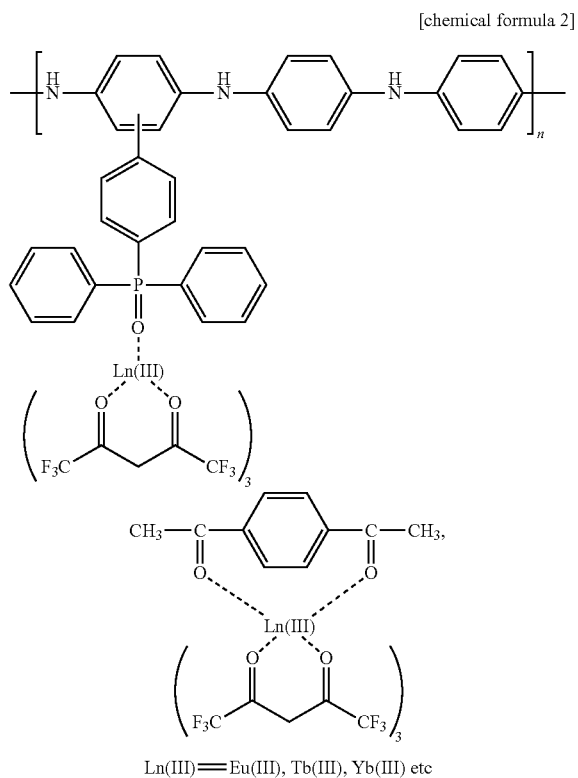

In the case shown in FIG. 3, it is preferable that the coloring material 41 and the light-emitting material 42 are alternately laminated with respective thicknesses of 10 nm or less. Maintaining such range of thicknesses easily leads to energy migration between the coloring material 41 and the light-emitting material 42. Thus, a plurality of display states can be performed.

The present display device, e.g. in the bright place, can display information by employing the reflective type display method (see the above FIG. 2). Specifically, in a portion of pixels, a voltage is applied between a pair of electrodes thereof. A color in the area where the voltage is applied different from a color in the area where the voltage is not applied, which leads to display screen. Moreover, when the voltage is not applied, no image is displayed. In this case, it is preferably that the light source does not emit light.

Meanwhile, in the dark place, information can be displayed by employing the light emission type display method. However, based on common consideration, in the case where image is displayed using the light-emitting material 42 for photoexcitation, in the consideration of area which emits light, it is necessary that light from the light source is supplied to a panel portion by masking a portion of light from the light source to adjust image shape to be displayed. In the present display device, however, electrodes used for the display method of reflective type are also used for the display method of light emission type, thus desirable image can be displayed without providing mask. This operation is described in FIG. 5.

Figure 5:
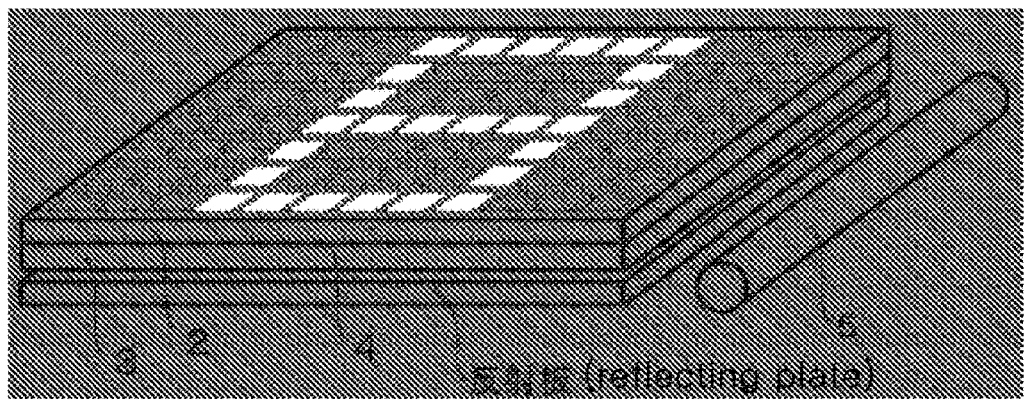
FIG. 5 is a view for describing display in a light emission type display method of a display device according to an embodiment 1 of the present invention.

In FIG. 5, when light from the light source is irradiated into the panel portion, the voltage is applied between electrodes of a portion of pixels, and the voltage is not applied between electrodes of the other portion of pixels. In the example of FIG. 5, pixels where the voltage is applied between electrodes are in a light-emitting state, whereas pixels where the voltage is not applied between electrodes are not in a light-emitting state.

Figure 6:
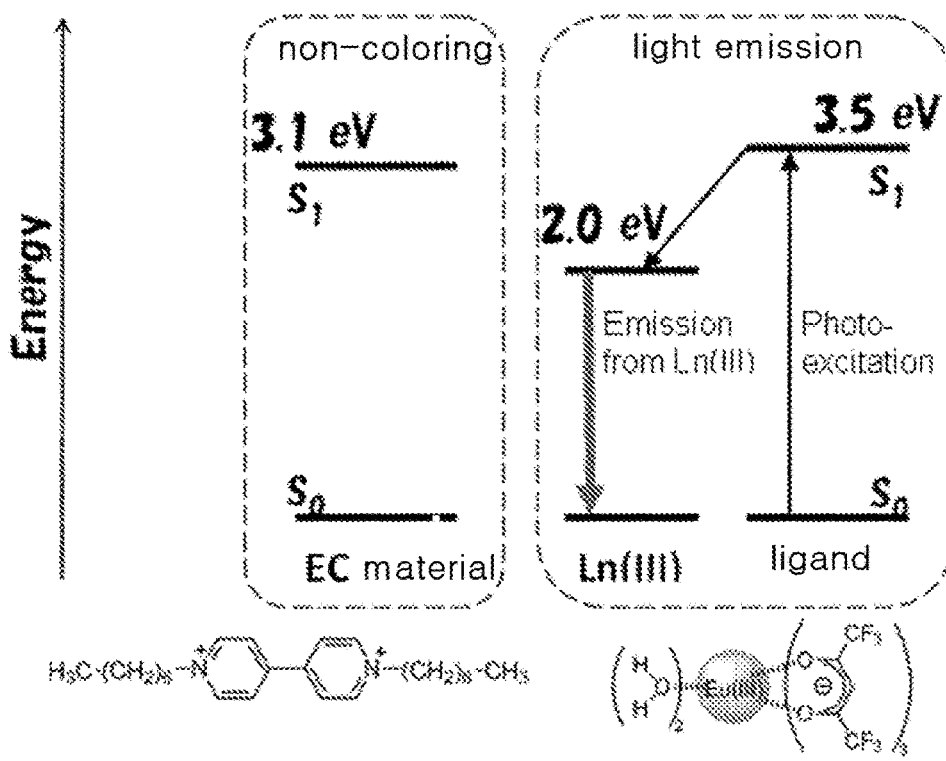
FIG. 6 is a view for describing principle of display of a display device according to an embodiment 1 of the present invention.
Figure 7:
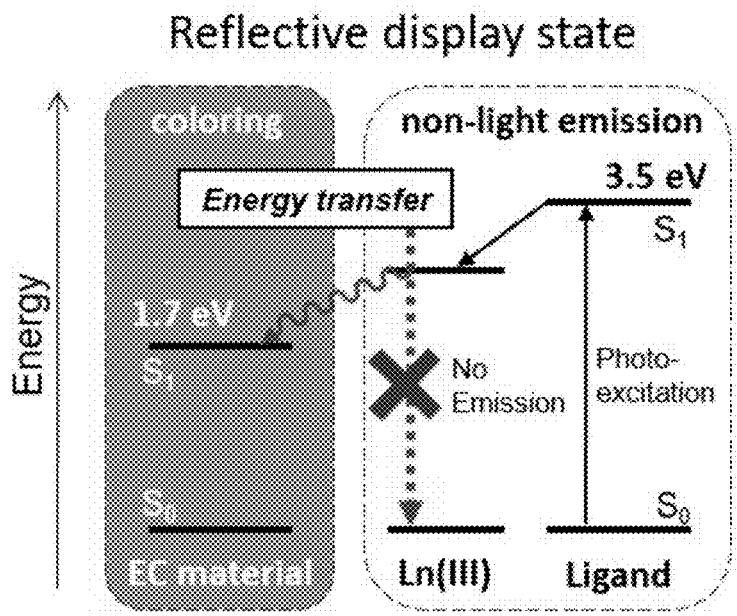
FIG. 7 is a view for describing principle of display of a display device according to an embodiment 1 of the present invention.
Figure 7:
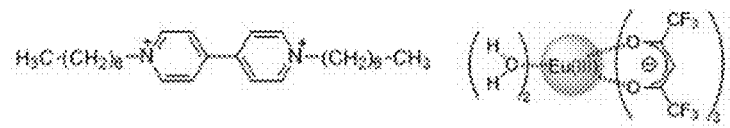

FIGS. 6 and 7 describe the principle thereof, and are views illustrating energy migration of the coloring material 41 (electrochromic material) and the light-emitting material 42 (rare earth complex). FIG. 6 shows the light-emitting display stage, and FIG. 7 shows the reflective type display state (coloring state), respectively. In these figures, $Eu(hfa)_3(H_2O)_2$ is used as the light-emitting material 42, and N,N'-diheptyl viologen is used as the coloring material 41. Left sides of the respective figures are views illustrating energy level of the coloring material 41 (electrochromic material), and right sides of the respective figures are views illustrating energy level of the light-emitting material 42.

In the case where display is performed using color change of the coloring material 41 as shown in FIG. 2, (reflective type display method). Only the migration of energy in the coloring material 41 of left sides may be considered. Specifically, the voltage is applied to generate electrochromic reaction, and difference of coloring between pixels where the voltage is applied and pixels where the voltage is not applied is produced, so that coloring is adjusted to display image. In this case, energy migrates into the same material. Moreover, there is no need to supply energy to the light-emitting material 42, therefore it is not necessary to allow the light source to emit light.

Meanwhile, in the case where display is performed using light emission of the light-emitting material 42 as shown in FIG. 5 (light-emitting display state), the voltage between electrodes is removed in the area (pixels) to be displayed, so that excited light from the light source is emitted. Then, in this area, light is excited by the light-emitting material 42 obtaining energy from the light source, so that light is emitted. However, in the area (pixels) where the voltage is applied between electrodes, the energy migrates into the coloring material 41 which is adjacent thereto, so that the energy becomes useless. As a result, the light-emitting area can also be distinguished from non-light-emitting area.

In order to realize the above plural display states, it is preferable that energy difference between ground state and excited state of the coloring material 41 is less than or equal to that of the light-emitting material 42 (preferably the difference of more than or equal to 1800 $cm^{-1}$). In this manner, it is possible to migrate energy from the light-emitting material 42 to the coloring material 41 (Förster type energy migration), and display for light emission or non-light emission can be controlled by suppressing the light emission.

Hereinabove, by display device according to the present embodiment, complicated element structure is prevented to provide a high quality display device without undesirably deteriorating portability. In particular, the display device according to the present embodiment has excellent effect such that the electrodes are not only used for coloring and non-coloring, but also used for masks of light emission and non-light emission.

The display device according to the present embodiment, for explanation, an area where the voltage is applied becomes non-light emission area, and an area where the voltage is not applied becomes light emission area. However, depending on energy state of the coloring material 41, the following configuration can be also used: an area where the voltage is not applied becomes non-light emission area, and an area where the voltage is applied becomes light emission area.

EXAMPLES

Herein, the effect on the above display device was confirmed using the material layer 4 including the coloring material 41 and the light-emitting material 42.

Example 1

Figure 8:
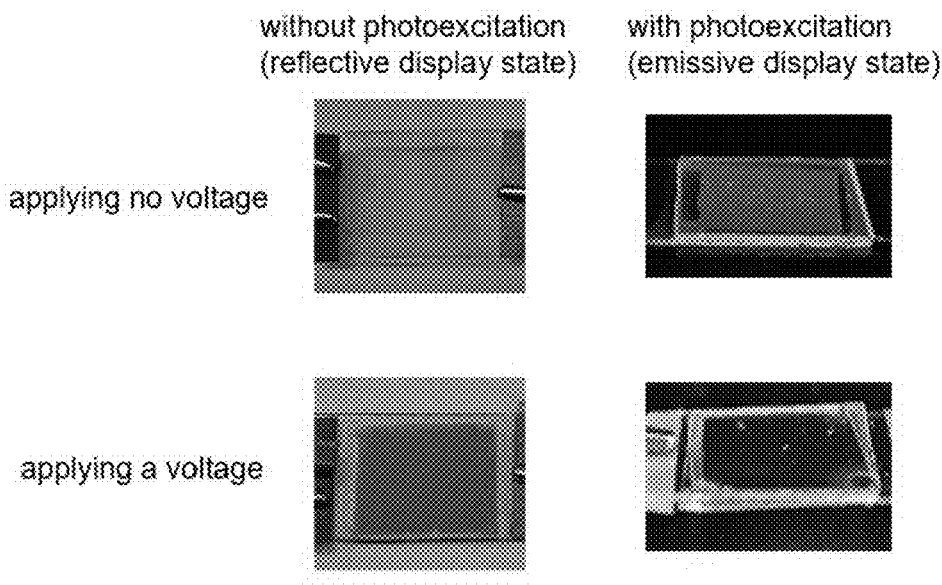
FIG. 8 is a view illustrating appearances (display state) of a display device according to example 1.
Figure 9:
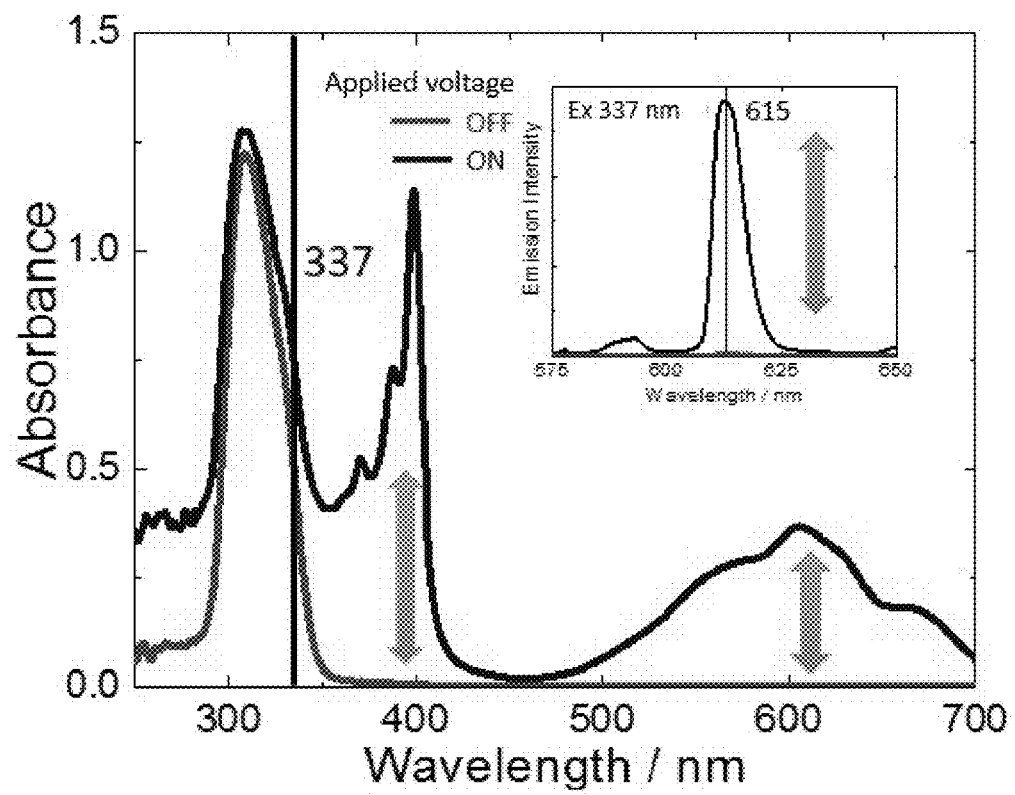
FIG. 9 is a view illustrating a measurement result of a display device according to example 1.

The material layer contained propylene carbonate as a solvent, 50 mM of TBAP as a supporting electrolyte, 10 mM of N,N'-diheptyl as a coloring material, and 10 mM of tris(hexafluoroacetylacetonate) europium complex ($Eu(hfa)_3(H_2O)_2$) as a light-emitting material described in the chemical formula 3 below. The material layer was placed in 70 μm spacers between a pair of substrates on which ITO electrodes have been formed, and the absorption characteristics and light-emitting intensity were measured upon applying a voltage (DC 2.2 V) or applying no voltage during photo-irradiation. FIG. 8 shows appearances of the display device according to the present example. FIG. 9 shows the result of the measurement. In this example, the wavelength of excited light from the light source was 337 nm.

(chemical formula 3)

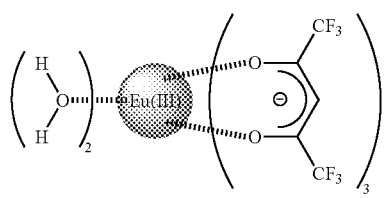

As shown in these figures, when the voltage was not applied and excited light was not irradiated, there was almost no absorption in the wavelength range of visible light (about 360 nm-830 nm) and it was transparent. Meanwhile, when the voltage was applied and excited light was not irradiated, peak absorption was observed around 400 nm and 600 nm, and the material layer was colored. Also, when the voltage was not applied and excited light was irradiated, emission of light that has peak wavelength of around 615 nm was found. Meanwhile, when an electric field was applied, there was no emission of light even when excited light was irradiated, and light was almost disappearing in the wavelength range of visible light. (reduced to 1/300 by the strength ratio.)

As a result, for instance, under a bright environment, it can be used as a reflective type display device without irradiating excited light, and just by applying or removing the voltage, whereas, under a dark environment, a display device can be enabled by irradiating excited light, removing the voltage on the part where light must be emitted, and applying the voltage on the part where light must not be emitted, in order to create light and shade.

Example 2

Figure 10:
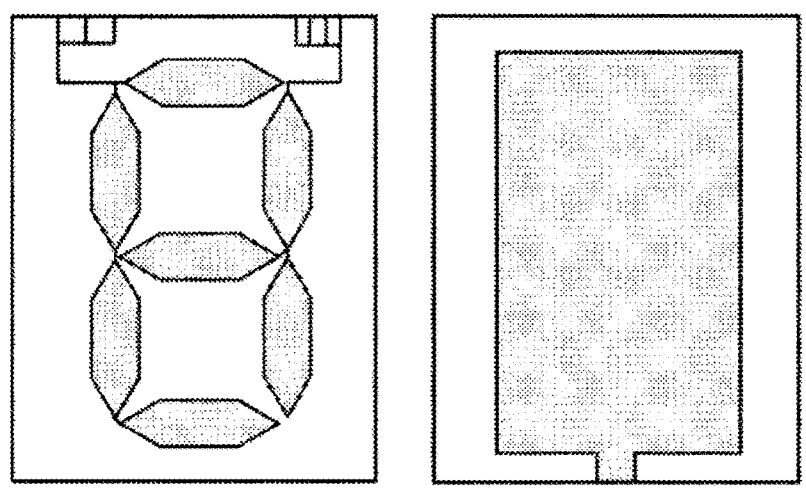
FIG. 10 is a view illustrating electrode shapes (segments) of a display device fabricated in example 2.
Figure 11:
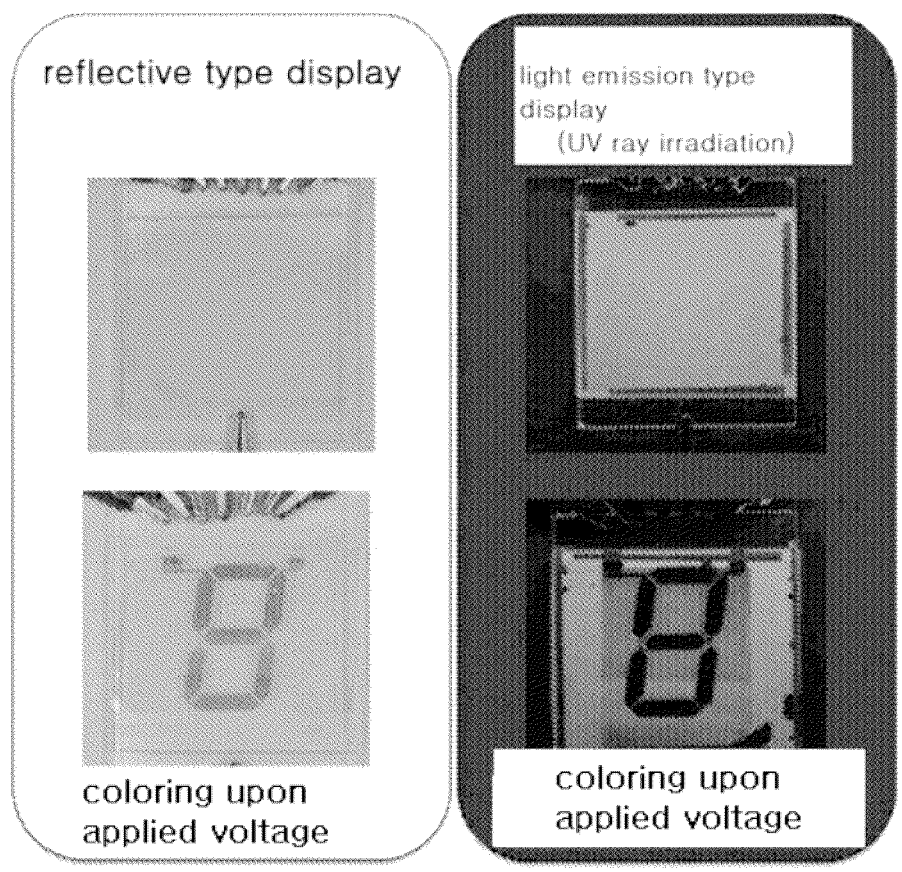
FIG. 11 a view illustrating appearances (display state) of a display device fabricated in example 2.

Also, the effect thereon was confirmed by using the same material as in the above example 1 and by fabricating display device after varying the shape of electrodes. Specifically, an electrode was used as a sheet-like electrode, and the other electrode was divided into multiple segments and assembled for the display device. FIG. 10 shows schematic electrode structures, and FIG. 11 shows the result of the actual display. In addition, the distance between electrodes and applied voltage of 2.2 V were also the same as in the example 1.

As a result, as shown in FIG. 11, when excited light is not provided from the light source, just by applying the voltage to segments that is needed, it can be functioned as a display having distinction between the coloring part and the non-coloring part. Meanwhile, when excited light is supplied from the light source, the segments to which the voltage is applied does not emit light, and the segments to which the voltage is not applied emits light, which enables the function as the display.

Example 3

Figure 12:
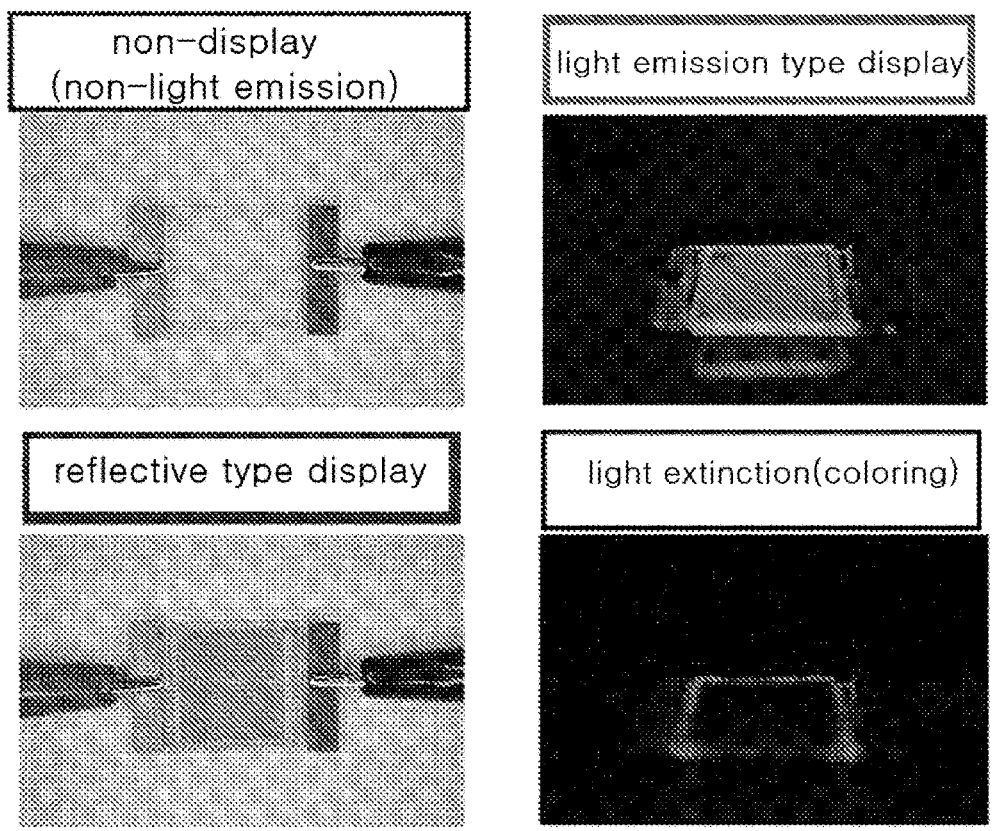
FIG. 12 is a view illustrating appearances (display state) of a display device fabricated in example 3.

In the resent example 3, the material layer contained propylene carbonate as a solvent, 200 mM of TBAP as a supporting electrolyte, 50 mM of DMT as a coloring material, and 50 mM of tris(hexafluoroacetylacetonate) europium (III) bis(triphenylphosphin oxide) as a light-emitting material described in the chemical formula 4 below. The material layer was placed in 70 μm spacers between a pair of substrates on which ITO electrodes have been formed, and the absorption characteristics and light-emitting intensity were measured upon applying the voltage (DC 4 V) or applying no voltage during photo-irradiation. FIG. 12 shows appearances of the display device according to the present example. In this example, the wavelength of excited light was 365 nm.

[chemical formula 4]

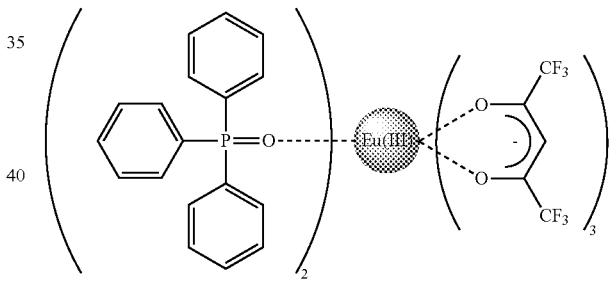

As a result, in the present example 3 which is the same as in the above examples 1 and 2, for instance, under a bright environment, it can be used as a reflective type display device without irradiating excited light, and just by applying or removing voltage, whereas, under a dark environment, a display device can be enabled by irradiating excited light, removing the voltage on the part where light must be emitted, and applying the voltage on the part where light must not be emitted, in order to create light and shade.

Hereinabove, the effect on the present display device was confirmed by examples. It is confirmed that a high quality display could be provided without damaging the portability by preventing complication of the element structure.

Embodiment 2

Figure 13:
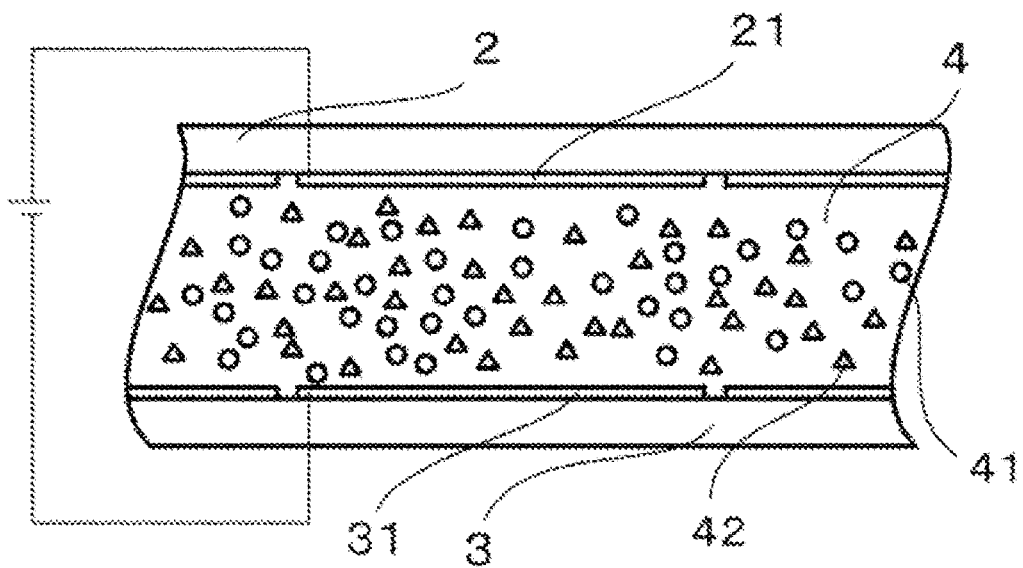
FIG. 13 is a view for describing display in a light emission type display method of a display device according to an embodiment 2 of the present invention.

In the above embodiment 1, the light-emitting material emits light upon photoexcitation. However, an electrochemical light-emitting material 42, which can emit light upon excitation based on an AC voltage, can replace or be added to the light-emitting material in embodiment 1. Not specifically limited, the examples of the electrochemical light-emitting material 42 preferably include Ru(bpy)$_3$(PF$_6$)$_2$, RuPF$_6$, RuCl$_6$, PVB (polyvinyl butyral), DPA (9,10-Diphenyl anthracene), TBAP (tetrabutylammonium perchlorate), and the like. In addition, the concentration of the electrochemical light-emitting material 42 is not specifically limited as long as it can emit light by excitation based on the AC voltage, and it can be appropriately adjusted depending on the types of materials. The concentration thereof is preferably 5 M or less, more preferably 1 mM or more and 1 M or less, and even more preferably 5 mM or more and 100 mM or less. Other than that, the structure as the display device is the same as in the above embodiment 1. FIG. 13 shows a schematic view of a constitution of the element according the present embodiment 2.

In the present display device, as described above, for example when the DC voltage was applied, information can be displayed by employing the reflective type display method. Specifically, for a portion of pixels, the voltage is applied between the pair of electrodes. Then, the difference between the area with applied voltage and the area without applied voltage becomes a display screen. Of course, when the voltage is not applied, it can stay without displaying any screen. In this case, the display device may include a pair of substrates, and a reflecting plate, placed on one side of the substrates, irradiating light from another light source (i.e., emitting light different from excited light in the above embodiment 1) into the pair of substrates. The strength of the voltage when applying the DC voltage can be appropriately modified by the distance between the pair of substrates, and the distance between the pair of electrodes. Not specifically limited, example of the electric field is preferably $1.0\times10^4$ V/m or more and $1.0\times10^6$ V/m or less, and more preferably $1.0\times10^5$ V/m or less.

Meanwhile, in the dark place, information can be displayed by employing a light emission type display method upon applying an AC voltage.

However, commonly, whether it is a DC voltage or an AC voltage, when applying the voltage to the display device, it is difficult to see display state because of the light emission produced by both materials. However, in the present display device, when applying a direct current (in case of displaying coloring), the electrochromic material 41 is colored by oxidation-reduction reaction, whereas the electrochemical light-emitting material 42 does not emit light because it produces either an oxidant body or a reducing body. On the other hand, when applying an alternating current (in case of light-emitting display), the electrochemical light-emitting material 42 can emit light because it produces both the oxidant body and the reducing body, but the electrochromic material 41 is not actually colored because it repeats coloring and disappearance of coloring at a high speed. As a result, the display device can have both a coloring mode and a light-emitting mode. As a result, unnecessary installation of mask, and the like that conceal the location with unclear display state is reduced, thereby facilitating the desired display screen.

Also, in case of the light emission type display, the strength of the AC voltage can be appropriately modified by distance between the pair of substrates, and distance between the pair of electrodes. Not specifically limited, examples of the electric field preferably is $1.0\times10^4$ V/m or more and $1.0\times10^6$ V/m or less, and more preferably $1.0\times10^5$ V/m or less.

Moreover, for the frequency of the AC voltage, coloring and disappearance of coloring in the electrochromic material 41 are not felt on human eyes to an extent. Not specifically limited, the frequency of the AC voltage may be to an extent that the electrochemical light-emitting becomes possible, and, although it is not limited, for example, 10 Hz or more and 1000 Hz or less is preferable, 30 Hz or more and 500 Hz or less is more preferable, and 50 Hz or more and 200 Hz or less is even more preferable.

Hereinabove, by the present display device according to the present embodiment, a high quality display can be provided without damaging the portability by preventing complication of the element structure.

Figure 14:
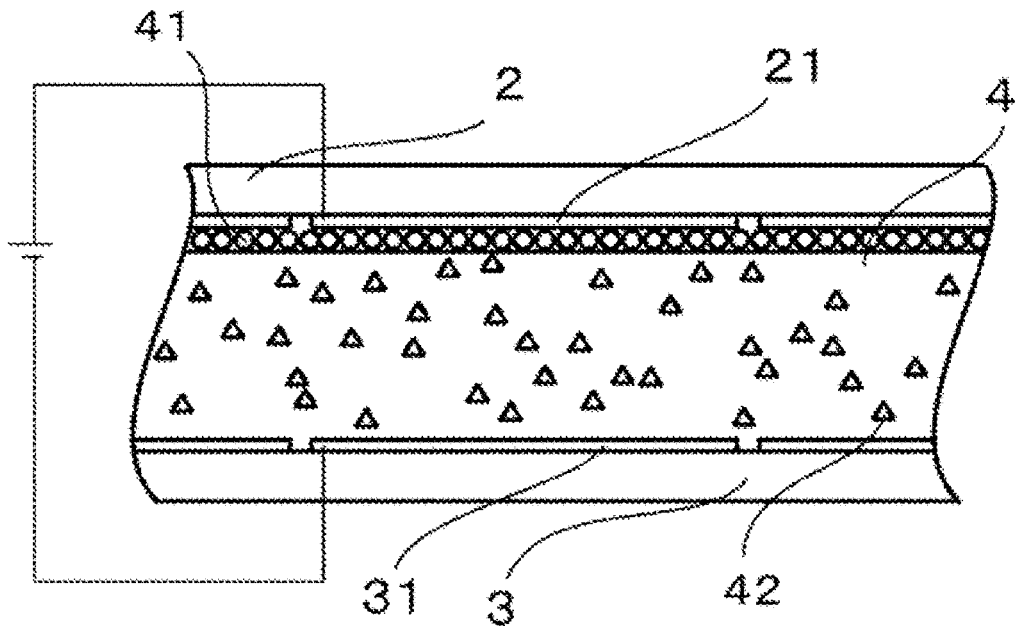
FIG. 14 shows a schematic cross-sectional view of a display device according to another embodiment of embodiment 2.

In the present embodiment 2, as well as including the electrochemical light-emitting material 42 in the material layer, one of the pair of electrodes is preferably modulated by the electrochromic material 41. FIG. 14 schematically shows the structure thereof. Specifically speaking, the display device according to the embodiment comprises a pair of substrates 2, 3, a pair of electrodes 21, 31 that are formed on the surface of the respective substrates 2, 3 facing each other, and the material layer 4 including the electrochemical light-emitting material 42 sandwiched between the pair of electrodes, wherein one of the pair of electrodes is modified by the electrochromic material 41.

In this embodiment, as described above, one of the pair of electrodes is modified by the electrochromic material. Herein, "modification" refers to the state of being maintained on electrode with a certain level of viscosity or with a solid state. For instance, polymer membrane, such as an ionic exchange membrane that maintains the electrochromic material 41, is formed on the electrode.

Figure 15:
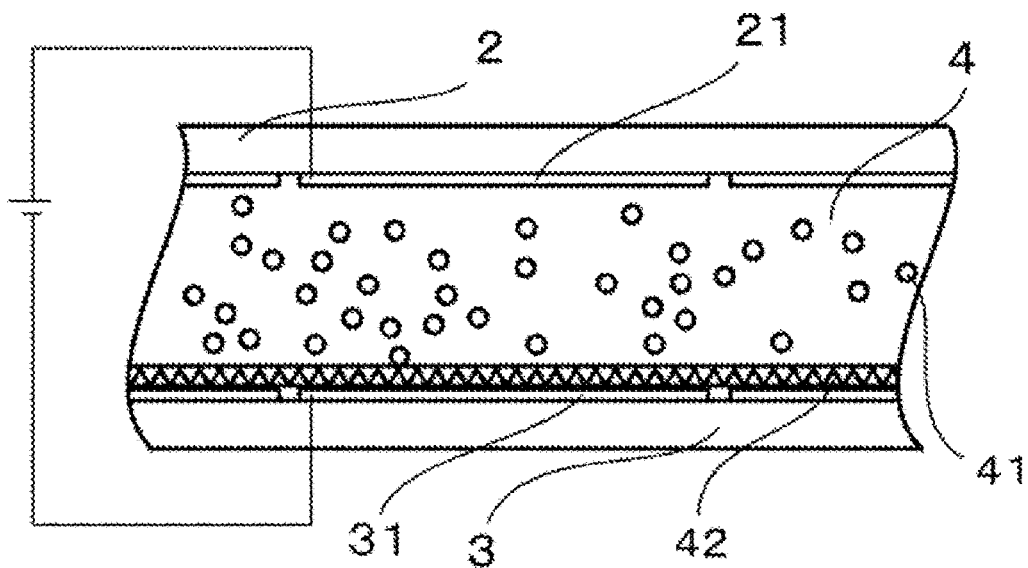
FIG. 15 shows a schematic cross-sectional view of a display device according to a third embodiment of embodiment 2.

In the present embodiment, it is desirable that the material layer contain an electrochromic material 41, and one of the pair of the electrodes be modified by the electrochromic material 41. FIG. 15 shows a schematic cross-sectional view of the display device according to the present embodiment. Specifically speaking, the display device according to the embodiment comprises a pair of substrates 2, 3, a pair of electrodes 21, 31 that are formed on the surface of the respective substrates 2, 3 facing each other, and the material layer 4 including the electrochromic material 41 sandwiched between the pair of electrodes, wherein one of the pair of electrodes is modified by the electrochemical light-emitting material 42.

In this embodiment, as described above, one of the pair of electrodes is modified by the electrochemical light-emitting material 42. Herein, "modification" refers to the state of being maintained on electrode with a certain level of viscosity or with a solid state. For instance, polymer membrane, such as an ionic exchange membrane that maintains the electrochemical light-emitting material 42, is formed on the electrode. Particularly, in this embodiment, modifying one electrode with the electrochemical light-emitting material 42 raises the concentration of the electrochemical light-emitting material 42 around the electrode, and it has the advantage of achieving functions of light emission type and reflective type more clearly.

Figure 16:
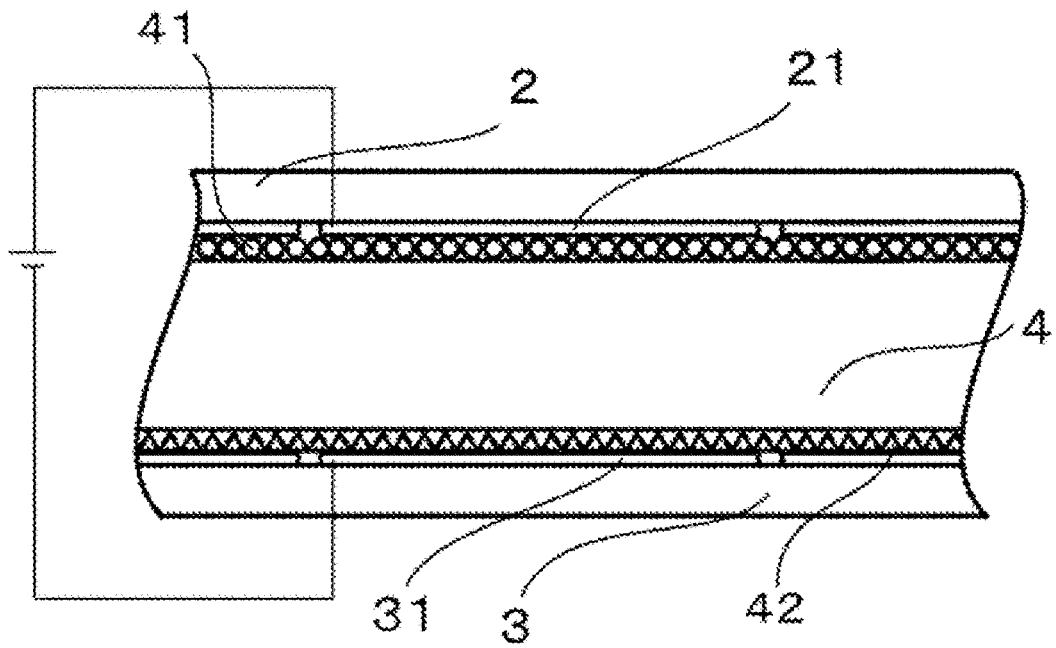
FIG. 16 shows a schematic cross-sectional view of a display device according to a fourth embodiment of embodiment 2.

Further, one electrode may be modified by the electrochemical light-emitting material 42, and the other electrode may be modified by the electrochromic material 41. Specifically speaking, the display device according to the embodiment comprises a pair of substrates 2, 3, a pair of electrodes 21, 31 that are formed on the surface of the respective substrates 2, 3 facing each other, and the material layer 4 sandwiched between the pair of electrodes, wherein one electrode is modified by the electrochemical light-emitting material 42 and the other electrode is modified by the electrochromic material 41. FIG. 16 shows the schematic cross-sectional view of the display device according to the present embodiment.

In this embodiment, as mentioned above, one electrode is modified by the electrochemical light-emitting material 42, and the other electrode is modified by the electrochromic material 41. Herein, "modification" refers to the state of being maintained on electrode with a certain level of viscosity or with a solid state. For instance, polymer membrane, such as an ionic exchange membrane that maintains the electrochemical light-emitting material 42, is formed on the electrode.

Hereinabove, by the present display device according to the present embodiment, a high quality display can be provided without damaging the portability by preventing complication of the element structure. Particularly, in this embodiment, modifying one electrode with the electrochemical light-emitting material 42 and modifying the other electrode with the electrochromic material 41 raises the concentrations of the electrochemical light-emitting material 42 and the electrochromic material 41 around the respective electrodes, and it has the advantage of achieving functions of light emission type and reflective type more clearly.

Example 4

Referring to the display device according to the above embodiment 2, the effect on the device element was confirmed using practical fabrication thereof. Hereinafter, description will be given in detail.

First, in this example 4, glass substrates were used for a pair of substrates, ITO for an electrode material, DMT for an electrochromic material, Ru complex (Ru(bpy)$_3$(PF$_6$)$_2$) for an electrochemical light-emitting material, DMSO for a solvent, and TBAP for a supporting electrolyte. In addition, the concentration of DMT was 50 mM, that of Ru complex 10 mM, and that of the supporting electrolyte 100 mM. The above electrolyte layer was sandwiched between the pair of substrates with spacers in order to the space between the pair of electrodes being maintained with 70 μm.

Figure 17:
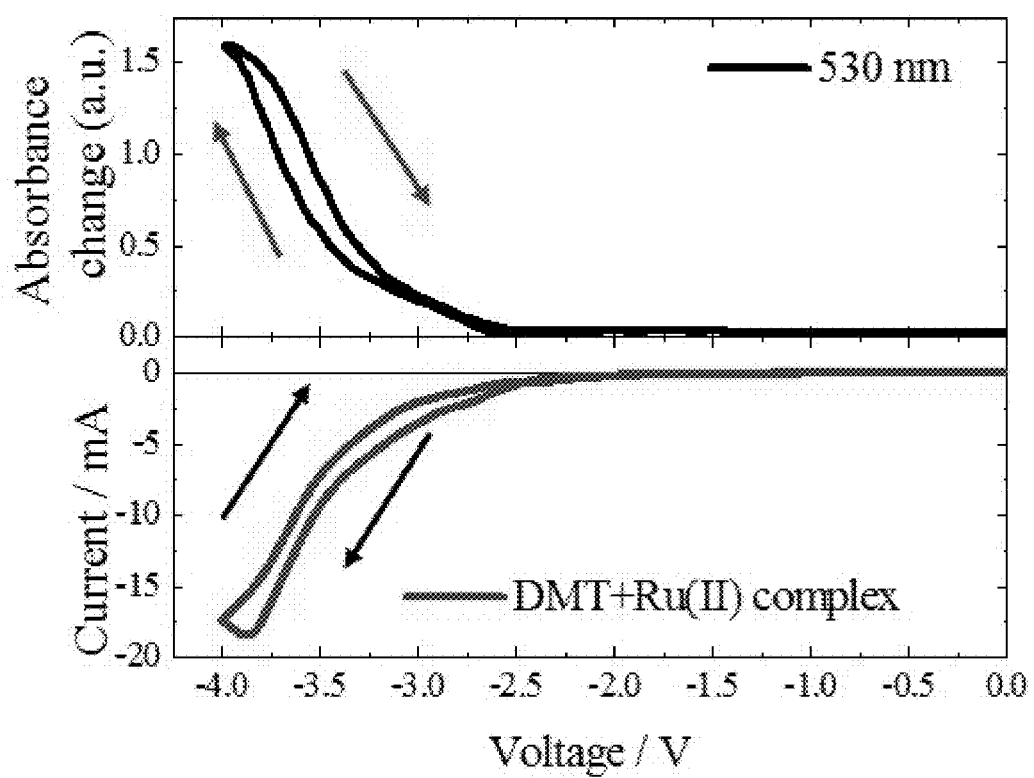
FIG. 17 is a view illustrating changes of electric current value and light absorption when DC voltages are applied to a display device in example 4.
Figure 18:
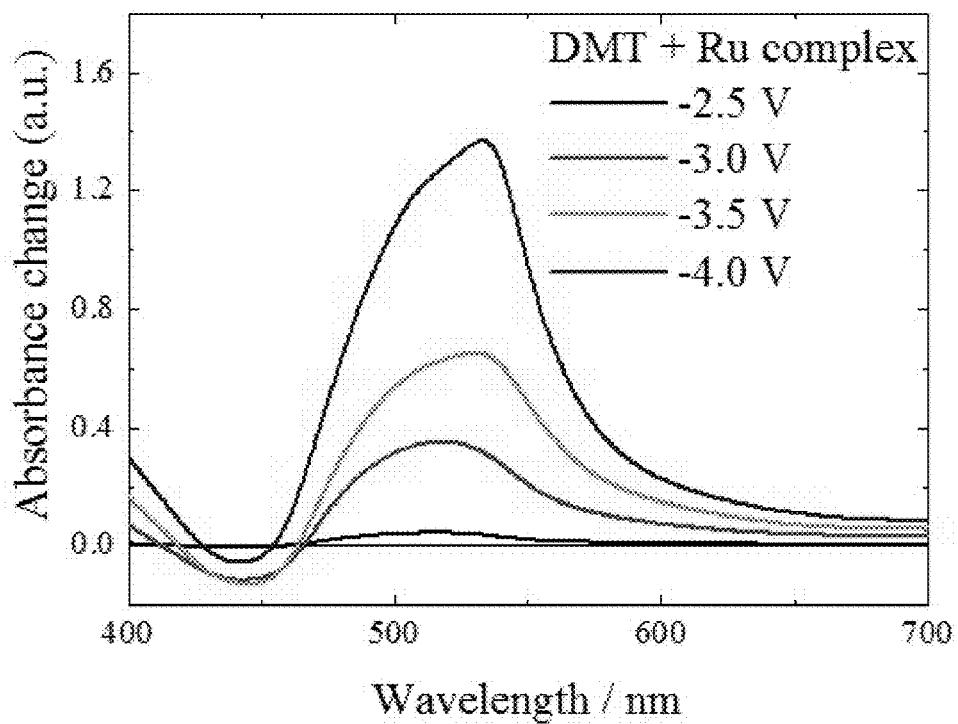
FIG. 18 is a view illustrating light absorption spectrums when DC voltages are applied to a display device in example 4.
Figure 19:
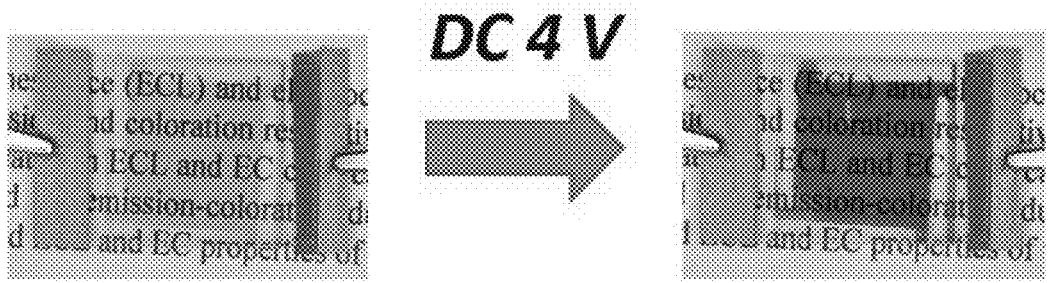
FIG. 19 is a photographic view illustrating change in coloring when a DC voltage is applied to a display device in example 4.
Figure 20:
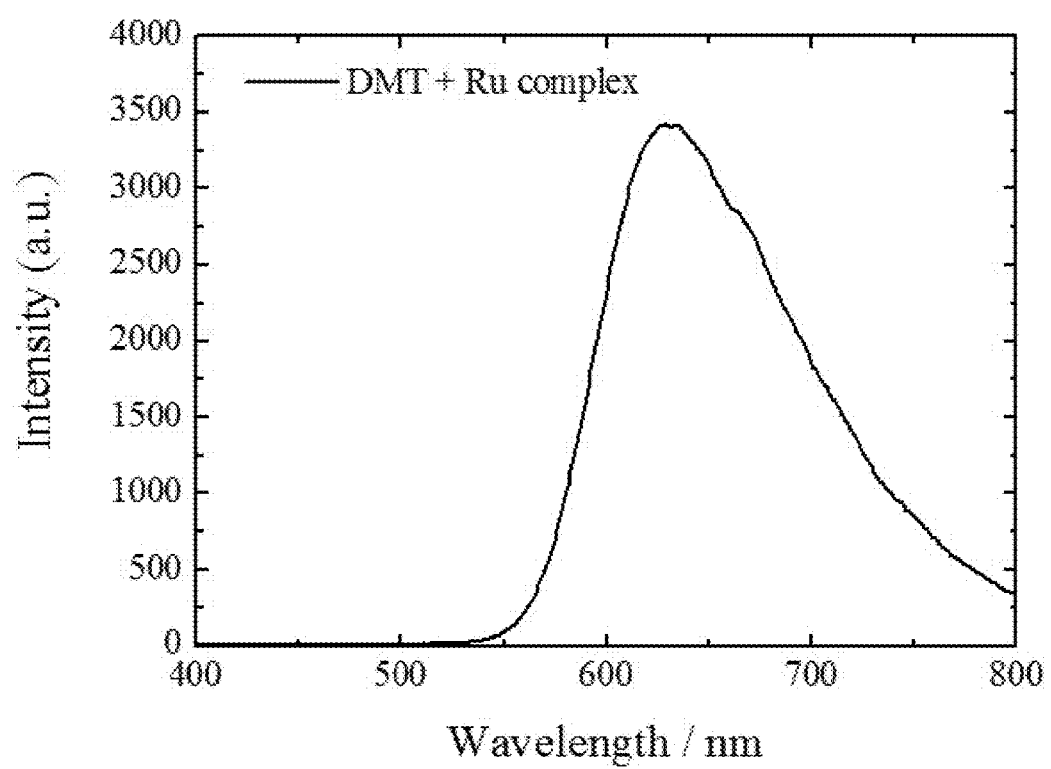
FIG. 20 is a view illustrating light intensity when an AC voltage is applied to a display device in example 4.
Figure 21:
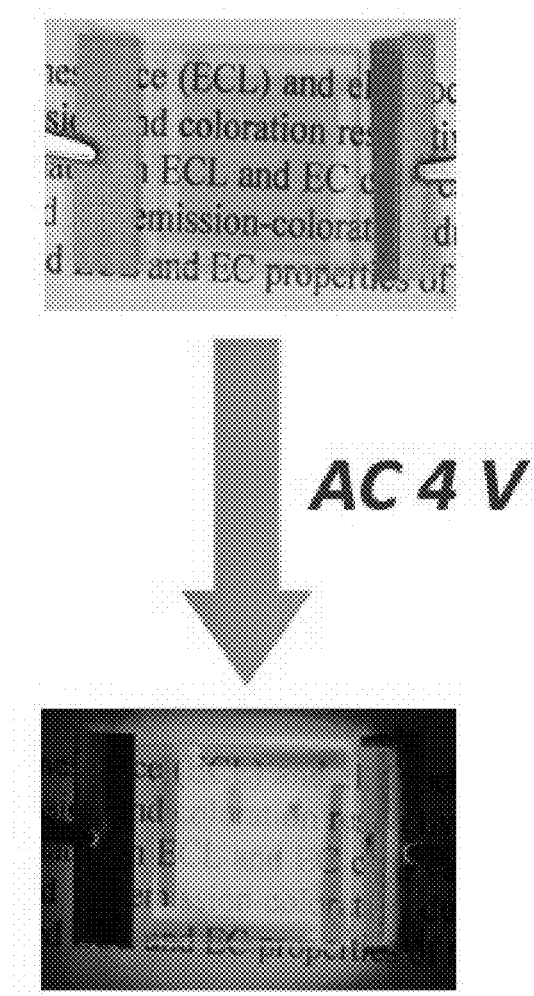
FIG. 21 is a photographic view illustrating change in light emission when an AC voltage is applied to a display device in example 4.
Figure 22:
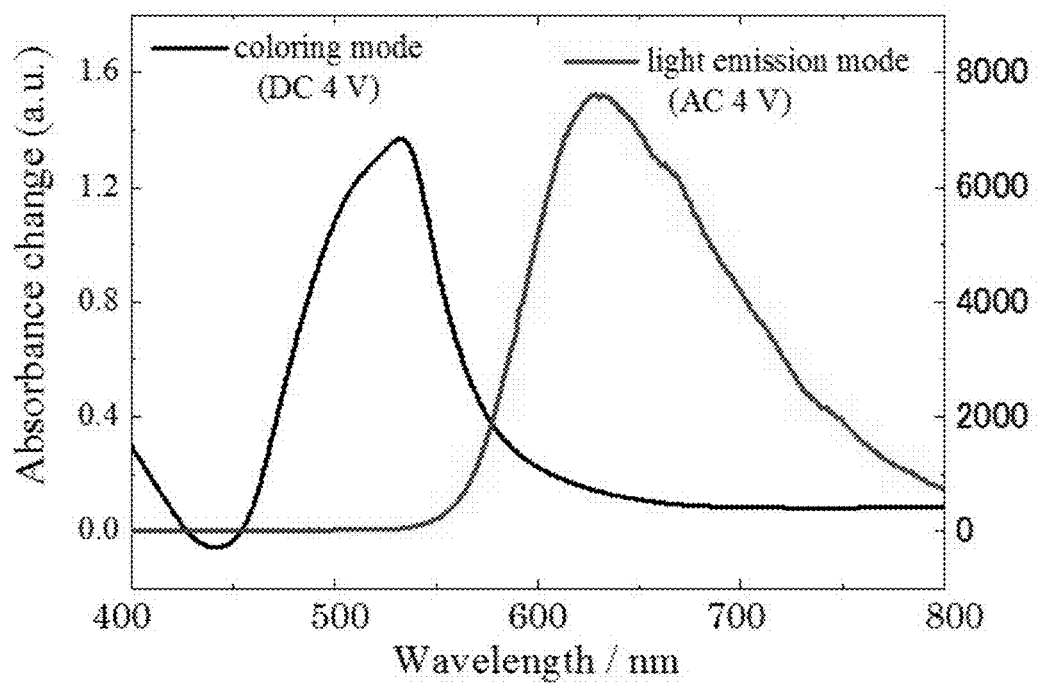
FIG. 22 is a view illustrating light absorption spectrum and light intensity spectrum when a coloring mode (reflective type) and a light emission mode (light emission type) are respectively drived in example 4.
Figure 23:
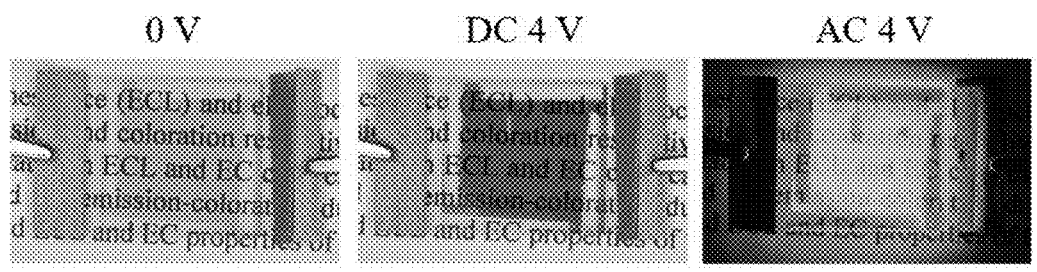
FIG. 23 is a photographic view illustrating a mode driving for a display device in example 4.

Then, the display states were confirmed by applying a DC voltage and an AC voltage. The results were shown in FIGS. 17 to 23. FIG. 17 is a view illustrating changes of current value and light absorption at 530 nm when changing DC voltages from −4 V to 0 V. FIG. 18 shows light absorption spectrum when changing the DC voltages to −2.5 V, −3.0 V, −3.5 V, and −4.0 V. FIG. 19 shows is a photographic view illustrating change of coloring based on change of the voltage. FIG. 20 is a view illustrating light-emitting intensity when applying AC voltage of ±4 V and 50 Hz. FIG. 21 is a photographic view illustrating the change of light emission in this case. FIG. 22 shows spectrums of light absorption and light intensity when operating a coloring (reflective type) mode and a light-emitting mode (light emission type), and FIG. 23 is a photographic view thereof.

As a result, it was confirmed that any display device of light emission type and reflective type could be realized by selecting the AC voltage or the DC voltage. The effectiveness of the display device according to the present invention was confirmed by this embodiment.

Example 5

Glass substrates were used for a pair of substrates, ITO for an electrode material, Polyethylene terephthalate (PET) derivative (VYLON 200, Toyobo) for an electrochromic material described the chemical formula 5 below, Ru complex (Ru(bpy)$_3$(PF$_6$)$_2$) for an electrochemical light-emitting material, DMSO for a solvent, and TBAP for a supporting electrolyte. The PET derivative was heated for 2 hours with OH:NCO=1:3 at 100° C. on the ITO glass, and cross-linked by isocyanate to modify electrode. Also, Ru complex was applied with 9% by weight of Flemion (ethanol solution) using spin-coating method (1000 rpm, 10 s, 1500 rpm, 10 s), and then immersed in 5 mM of Ru complex aqueous solution to absorb Ru complex into ionic exchange membrane, thereby modifying the other electrode. Also, the distance of 300 μm between electrodes was maintained by spacers, and the electrolytic layer containing 50 mM of TBAP and 20% by weight of DMSO was sandwiched between the pair of substrates.

[chemical formula 5]

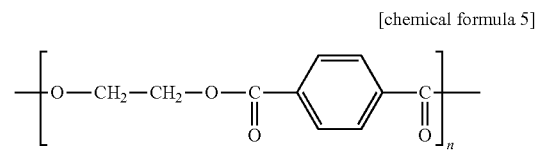

Figure 24:
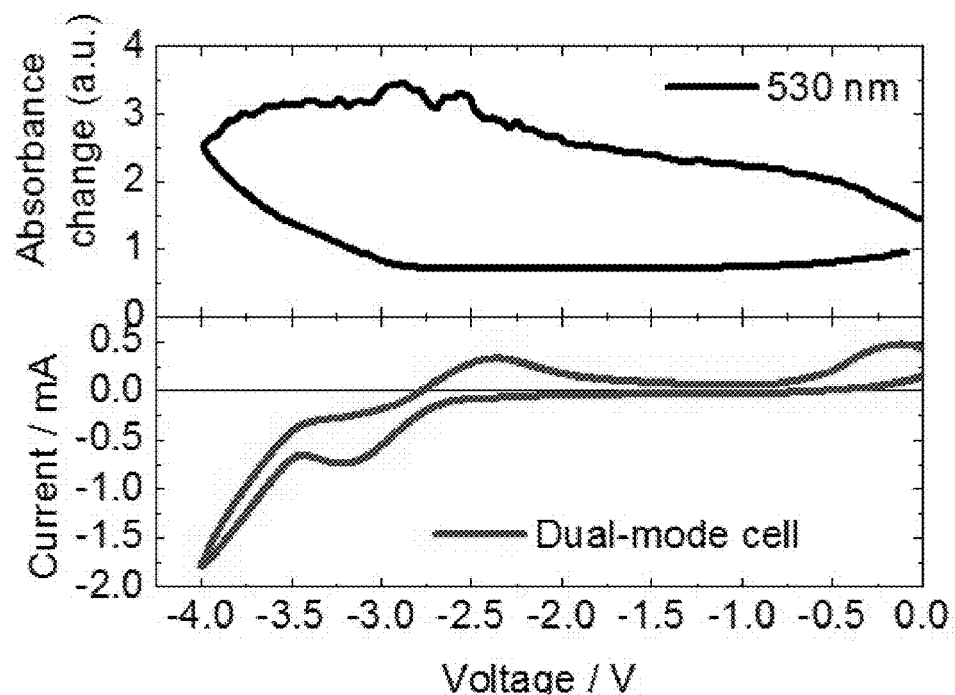
FIG. 24 is a view illustrating changes of electric current value and light absorption when DC voltages are applied to a display device in example 5.
Figure 25:
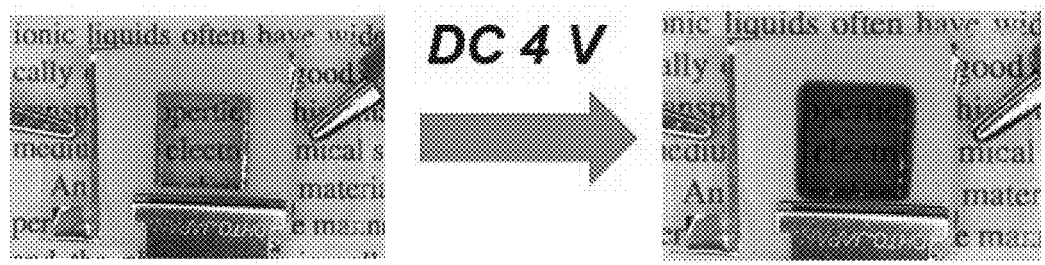
FIG. 25 is a photographic view illustrating change in coloring when a DC voltage is applied to a display device in example 5.
Figure 26:
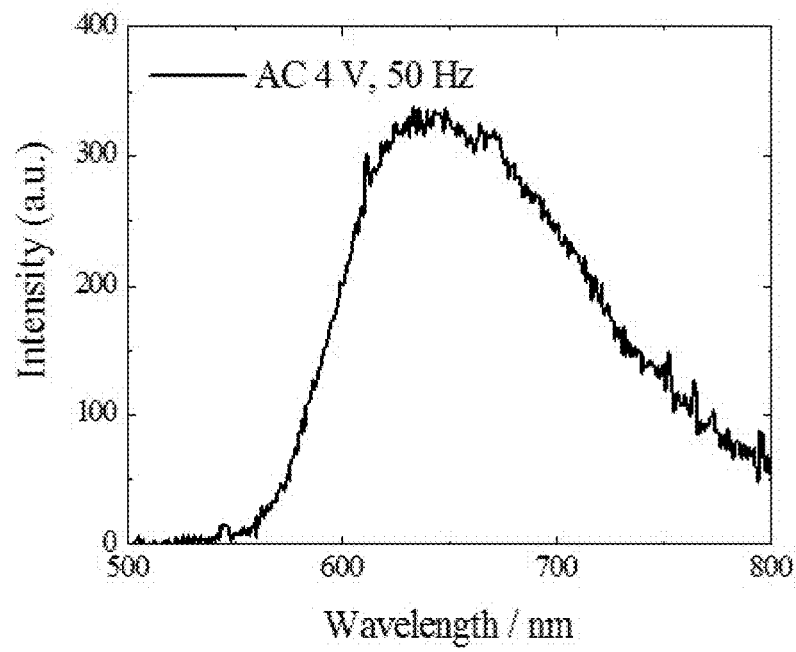
FIG. 26 is a view illustrating light intensity when an AC voltage is applied to a display device in example 5.
Figure 27:
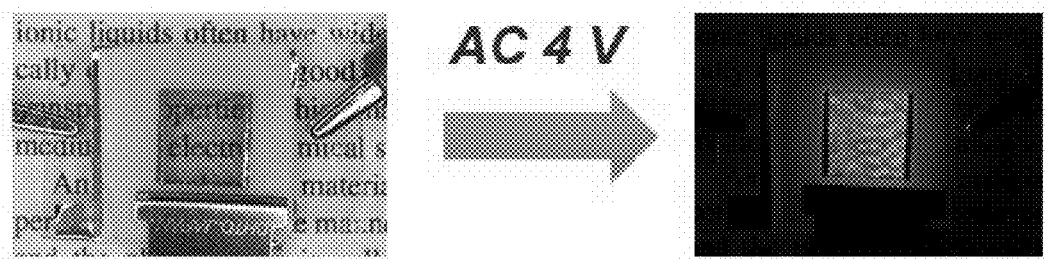
FIG. 27 is a photographic view illustrating change in light emission when an AC voltage is applied to a display device in example 5.
Figure 28:
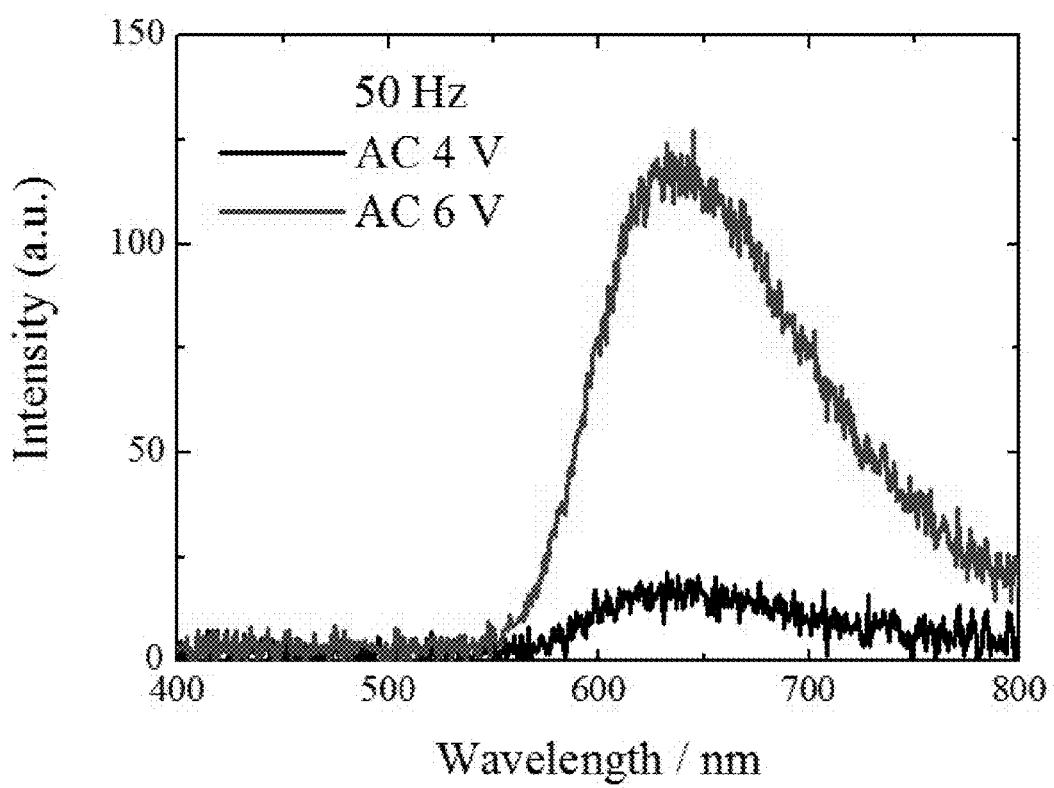
FIG. 28 is a view illustrating light intensities when AC voltages are respectively set to 4 V and 6 V in example 5.

Then, the display states were confirmed by applying a DC voltage and an AC voltage. The results were shown in FIGS. 24 to 27. FIG. 24 is a view illustrating changes of the current value and light absorption at 530 nm when changing DC voltages from −4 V to 0 V. FIG. 25 is a photographic view illustrating change of coloring based on change of the voltage. FIG. 26 is a view illustrating the light-emitting intensity when applying AC voltage of ±4 V and 50 Hz. FIG. 27 is a photographic view illustrating change of the light emission in this case. FIG. 28 shows light-emitting intensities when applying the DC voltages of 4 V and 6 V, respectively.

As a result, it was confirmed that any display device of light emission type and reflective type could be realized by selecting the AC voltage or the DC voltage. The effectiveness of the display device according to the present invention was confirmed by this embodiment.

INDUSTRIAL APPLICABILITY

The present invention is industrially applicable as a display device.

DESCRIPTION OF REFERENCE NUMERALS

1 - - - display device
2, 3 - - - substrates
4 - - - material layer

The invention claimed is:
1. A display device, comprising:
a pair of substrates which are disposed facing each other, and on each of which electrodes are formed; and
a material layer which is sandwiched between the pair of substrates;
wherein the material layer contains a coloring material which changes color upon the application of a DC voltage, and a light-emitting material which emits light upon excitation based on an AC voltage,
wherein when applying the DC voltage, the coloring material changes color through an oxidation-reduction reaction, whereas the light-emitting material does not emit light,
wherein the light-emitting material contains at least one of Ru(bpy)$_3$(PF$_6$)$_2$, RuPF$_6$, RuCl$_6$, PVB (polyvinyl butyral), and TBAP (tetrabutylammonium perchlorate), wherein when applying the AC voltage, the light-emitting material emits light, whereas the coloring material is not actually colored.

2. The display device according to claim 1, wherein the strength of the DC voltage is in a range of $1.0 \times 10^4$ V/m to $1.0 \times 10^6$ V/m.

3. The display device according to claim 1, wherein a strength of the AC voltage is in a range of $1.0 \times 10^4$ V/m to $1.0 \times 10^6$ V/m, and a frequency of the AC voltage is in a range of 10 Hz to 1000 Hz.

4. The display device according to claim 1, wherein the coloring material includes at least any of 1,4-diacetyl benzene, N,N'-dimethyl viologen, poly(3,4-ethylenedioxythiophene), polyaniline, 1,4-diheptyl viologen, 4,4'-biphenyl dicarboxylic acid diethyl ester, and dimethyl terephthalate.

5. The display device according to claim 1, wherein one of the electrodes is modified by the coloring material.

6. The display device according to claim 1, wherein one of the electrodes is modified by the light-emitting material.

7. The display device according to the claim 1, wherein at least one of the coloring material and the light-emitting material is dispersed to the concentration of 5 mM or more and 300 mM or less in the material layer.

8. The display device according to claim 1, wherein an energy difference between a ground state and an excited state of the coloring material is less than 1800 $cm^{-1}$ from that of the light-emitting material.

9. The display device according to claim 1, wherein the coloring material is adjacent to the light-emitting material.

10. The display device according to claim 1, wherein when applying the AC voltage, the light-emitting material emits light in areas where the voltage between the pair of electrodes is removed, and the light-emitting material does not emit light in areas where the voltage between the pair of electrodes is applied.

11. The display device according to claim 1, further comprising a light source for photoexcitation.

12. A display device, comprising:
a pair of substrates which are disposed facing each other, and on each of which electrodes are formed;
a material layer which is sandwiched between the pair of substrates;
wherein the material layer contains a coloring material which changes color upon the application of a DC voltage, and a light-emitting material which emits light upon excitation based on an AC voltage,
wherein when applying the DC voltage, the coloring material is colored by an oxidation-reduction reaction,
wherein the light-emitting material contains Ru complex,
the coloring materials contains at least one of DMT 1,4-diacetyl benzene, 4,4-biphenyl dicarboxylic acid diethyl ester,
wherein when applying the AC voltage, the light-emitting material emits light, whereas the coloring material is not actually colored.

13. A display device, comprising:
a pair of substrates which are disposed facing each other, and on each of which electrodes are formed; and
a material layer which is sandwiched between the pair of substrates;
wherein the material layer contains a coloring material which changes color upon the application of a DC voltage but not an AC voltage, and a light-emitting material which emits light upon excitation based on an AC voltage but does not emit light upon application of a DC voltage,
wherein when applying the DC voltage, the coloring material changes color through an oxidation-reduction reaction, whereas the light-emitting material does not emit light,
wherein the light-emitting material contains at least one of $Ru(bpy)_3(PF_6)_2$, $RuPF_6$, $RuCl_6$, PVB (polyvinyl butyral), and TBAP (tetrabutylammonium perchlorate).

* * * * *